Aug. 23, 1955 J. L. GRYGIEL 2,715,972
WAGON GATE UNLOADING ATTACHMENT
Filed June 15, 1953 2 Sheets-Sheet 1
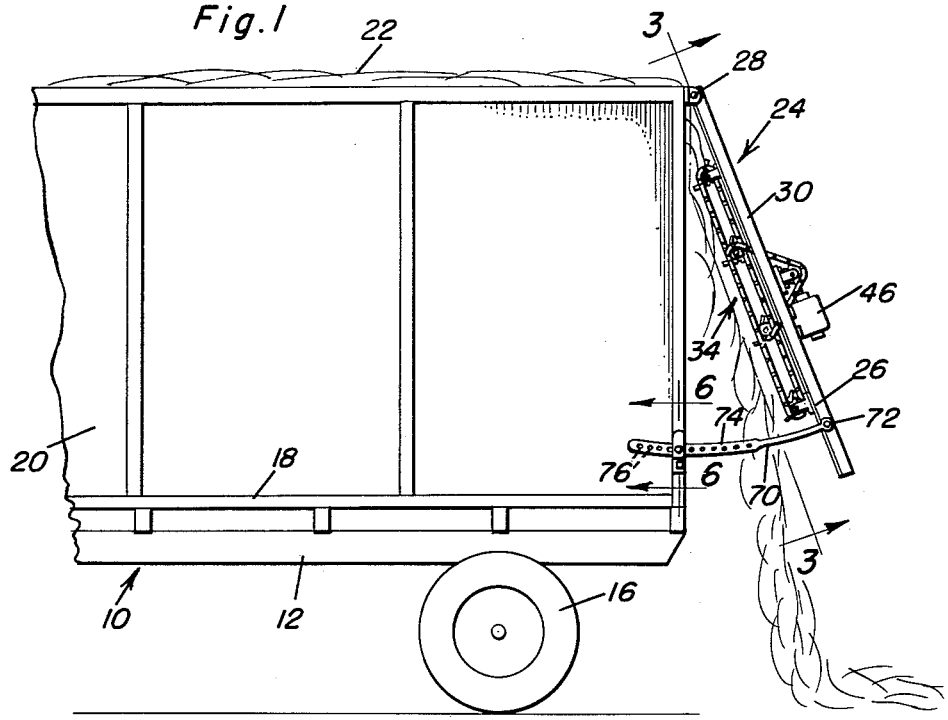
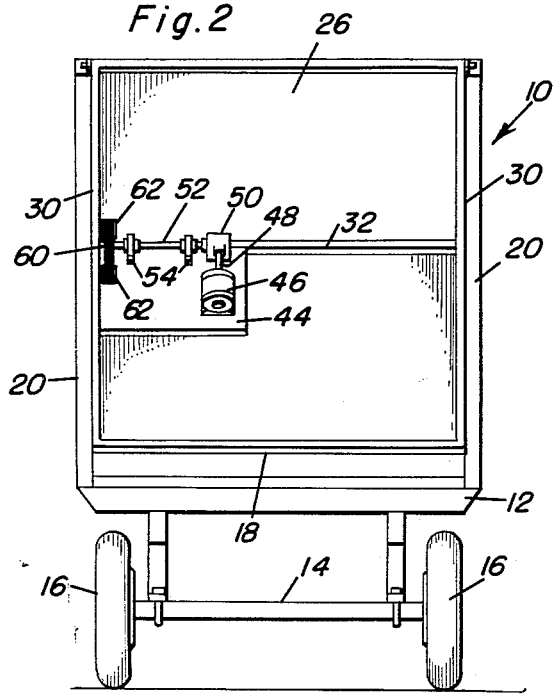
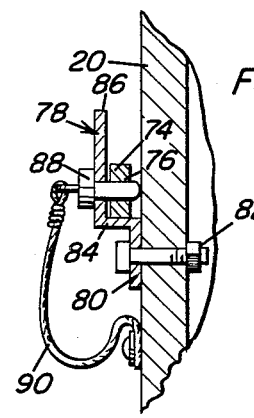
Joseph L. Grygiel
INVENTOR.

Aug. 23, 1955   J. L. GRYGIEL   2,715,972
WAGON GATE UNLOADING ATTACHMENT
Filed June 15, 1953   2 Sheets-Sheet 2
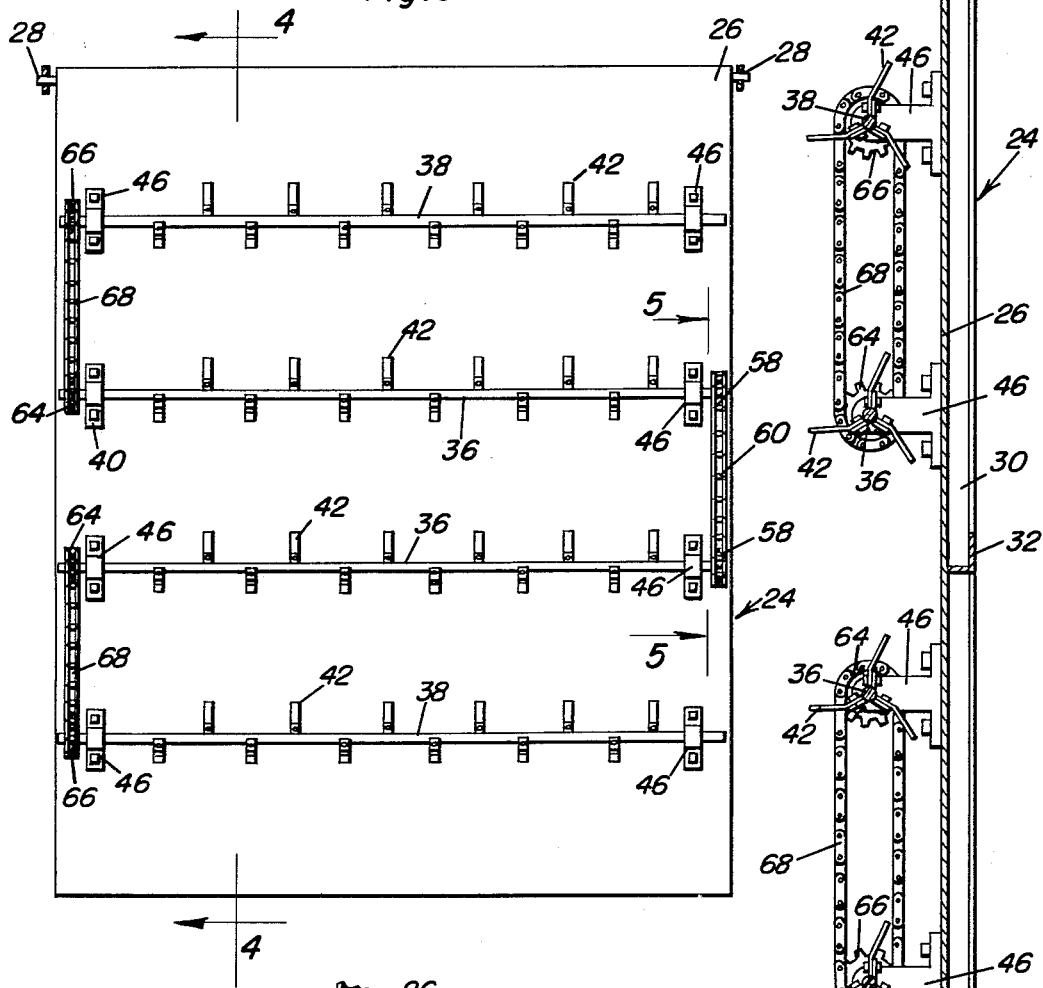
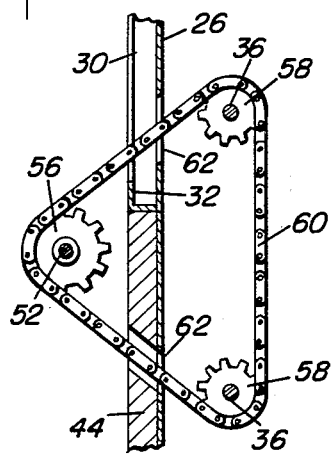
Joseph L. Grygiel
INVENTOR.

United States Patent Office 2,715,972
Patented Aug. 23, 1955

2,715,972

WAGON GATE UNLOADING ATTACHMENT

Joseph L. Grygiel, Krakow, Wis.

Application June 15, 1953, Serial No. 361,552

2 Claims. (Cl. 214—83)

This invention relates in general to improvements in farm wagons, and more specifically to an improved farm wagon gate which is provided with means for unloading a farm wagon of which it is a part.

At the present time on many farms, hay, straw, green hay or other silage is chopped prior to storage thereof. The chopped silage is unloaded from the chopper into chopper wagons which then carry the chopped silage to a point adjacent a silo or other storage place. The chopped silage is then dumped into a blower which blows the silage into the silo. In order that the chopped silage may be unloaded from the wagon, it is necessary that the farmer stand at the rear of the wagon and continuously urge the chopped silage down over the rear of the wagon into the intake of the blower. Not only is this a dusty and dirty job, but it also requires the expenditure of time on the part of the farmer which could be otherwise utilized.

It is, therefore, the primary object of this invention to provide an improved wagon gate which includes means for automatically urging chopped silage and the like down out of the rear of a wagon into a suitable receptacle whereby the wagon may be automatically unloaded while the farmer is doing other work.

Another object of this invention is to provide an improved wagon gate for farm wagons which is provided with a plurality of transversely extending shafts on the inner surface thereof, the shafts being rotatably mounted and being provided with tines the tines being so mounted whereby they urge chopped silage down out of the rear of the wagon with which the wagon gate is associated.

Another object of this invention is to provide an improved unloader for farm wagons in the form of a plurality of transversely extending, rotatably mounted shafts carried on the inner side of a farm gate, the shafts being provided at spaced intervals with circumferentially spaced tines for urging chopped silage and the like down out of the rear of the wagon, the rear surface of the wagon gate being provided with drive means for rotating the shafts, the drive means being protected from the dust and dirt of the silage by the wagon gate.

A further object of this invention is to provide an improved wagon gate for farm wagons which includes unloading means, the unloading means being carried by the inner side of the wagon gate, the inner side of the wagon gate being selectively spaced from and disposed at an angle to the rear of the farm wagon with which it is associated by adjustable spacing members so that the load on the unloading means may be selectively varied.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of the rear portion of the farm wagon equipped with the wagon gate which is the subject of this invention, the wagon gate being illustrated in an operative position;

Figure 2 is a rear elevational view of the farm wagon of Figure 1 and shows the arrangement of drive means for the unloading means carried by the wagon gate;

Figure 3 is an enlarged sectional view taken substantially upon the plane indicated by the section line 3—3 of Figure 1 and shows the arrangement of the unloading means carried by the inner surface of the wagon gate;

Figure 4 is an enlarged fragmentary sectional view taken substantially upon the plane indicated by the section line 4—4 of Figure 3 and shows the manner in which the unloading means are mounted on the inner surface of the wagon gate;

Figure 5 is an enlarged fragmentary sectional view taken substantially upon the plane indicated by the section line 5—5 of Figure 3 and shows the main drive means for the unloading means; and, Figure 6 is an enlarged fragmentary sectional view taken substantially upon the plane indicated by the section line 6—6 of Figure 1 and shows the manner in which the adjustable spacer member is adjustably secured to a side of the farm wagon.

Referring now to the drawings in detail, it will be seen that there is illustrated in Figures 1 and 2 a conventional farm wagon which is referred to in general by the reference numeral 10. The farm wagon 10 includes a frame 12 which is supported by an axle 14 turning wheels 16. Carried by the frame 12 is a wagon body which includes a bottom 18 and vertically extending side walls 20.

It will be understood that the farm wagon 10 is utilized for the transportation of chopped silage 22 from a silage chopper to a blower and that the chopped silage 22 is then dumped from the rear of the farm wagon 10 into an intake of such blower (not shown) so that the chopped silage 22 may be conveniently blown into a silo or other storage place. This necessitates a farmer standing at the rear of the farm wagon 10 and progressively feeding the chopped silage 22 from the rear thereof into the intake of the blower. In order that the farmer may be relieved of such a task, the farm wagon 10 is provided with the wagon gate which is the subject of this invention, the wagon gate being referred to in general by the reference numeral 24.

The wagon gate 24 includes a conventional gate element 26 which is hingedly secured to the upper corners of the side walls 20 by suitable hinges 28. The gate element 26 is reinforced along its sides by vertically extending angle members 30 and intermediate its upper and lower edges by a transversely extending angle member 32. It will be understood that the angle members 30 and 32 are secured to the rear surface of the gate element 26 in the manner best illustrated in Fig. 4.

The wagon gate 24 includes unloading means which are referred to in general by the reference numeral 34. The unloading means 34 are secured to the inner surface of the gate element 26 and include a pair of centrally disposed transversely extending shafts 36. The unloading means 34 also include a pair of outer shafts 38, the outer shafts being disposed adjacent the upper and lower edges of the gate element 26. Carried by the inner surface of the gate element 26 adjacent the side edges thereof are suitable pillow blocks 40 in which the ends of the shafts 36 and 38 are rotatably mounted, the ends of these shafts projecting beyond the pillow blocks 40 toward the edges of the gate element 26.

Suitably secured to the shafts 36 and 38 are tines 42 whose configurations are best illustrated in Figure 4. The tines 42 are both circumferentially and longitudinally spaced along the shafts 36 and 38 in the manner best illustrated in Figures 3 and 4. It will be understood that the purpose of the tines is to urge chopped silage 22 down out of the rear of the farm wagon 10.

In order that the shafts 36 and 38 and their associated tines 42 may be selectively rotated, there is secured to the rear surface of the gate element 26 a mounting platform 44. The mounting platform 44 is provided with a suitable prime mover 46 which includes a drive shaft 48. The drive shaft 48 is connected to a gear box 50 which in turn has a drive shaft 52. The drive shaft 52 is suitably mounted in spaced pillow blocks 54 and extends transversely of the gate element 26 as substantially the midpoint of its height.

Referring now to Figures 3 and 5 in particular, it will be seen that the drive shaft 52 has mounted thereon adjacent one end thereof a drive sprocket 56. The drive sprocket 56 is in the same plane as drive sprockets 58 carried by associated ends of the centrally disposed shafts 36. Connecting the sprockets 56 and 58 is a drive chain 60 which passes through selective openings 62 and the gate element 26. It will thus be seen that when the prime mover 46 is actuated the centrally disposed shafts 36 will be rotated.

Referring now to Figures 3 and 4 in particular, it will be seen that the ends of the centrally disposed shafts 36 opposite from the ends on which the sprockets 58 are mounted are provided with sprockets 64. The sprockets 64 are disposed in alignment with sprockets 66 carried by adjacent ends of adjacent outer shafts 38. Connecting the sprockets 64 and 66 of each pair of shafts 36 and 38 is a drive chain 68. Thus it will be seen that when the shafts 36 are rotated, the shafts 38 will be rotated at the same speed.

Referring now to Figures 1 and 6 in particular, it will be seen that there are pivotally secured to opposite side edges of the wagon gate 24 adjacent the lower edges thereof elongated spacing members 70. The spacing members 70 have their rear ends pivotally connected to the angle members 30 with which they are associated by pivot pins 72. The forward portions of the spacing members 70 are arcuate and in the form of relatively flat bars 74, the forward portions of the spacing members being integral with the remainder thereof. The flat bars 74 are provided with a plurality of longitudinally spaced apertures 76.

As is best illustrated in Figure 6, carried by each side 20 of the farm wagon 10 is a Z-shaped bracket 78. The bracket 78 has a lower flange 80 thereof secured to the side 20 by fastener 82. The web 84 and an upper flange 86 combine with the outer surface of the side 20 to form a pocket for the reception of the flat bar 74 associated therewith. Removably carried by the upper flange 86 is a pin 88 which is selectively passed through one of the apertures 76 and the flat bar 74 whereby the position of the wagon gate 24 may be adjusted. The pin 88 is retained by a flexible member 90 to prevent loss thereof.

In operation the farm wagon 10 is positioned adjacent an intake of a blower (not shown) in such a manner so that the chopped silage 22 carried thereby will be urged towards the rear thereof. When the unloading means 34 is in operation, the tines 42 revolve to urge the chopped silage 22 downwardly at a constant rate whereby the even flow of chopped silage 22 to the intake of the blower is assured. In order that the load on the unloading means 34 and the blower may be selectively varied, the angle of the wagon gate 24 is varied through the use of the spacing members 70. It will be seen that the position of the wagon gate 24 with respect to the open rear end of the wagon 10 will vary the amount of silage 22 passing thereoutof and consequently vary the load on both the unloading means 34 and the blower. Once the wagon gate 24 has been set at the proper position and the prime mover 46 set into operation, the unloading of the silage 22 from the wagon 10 is automatic and the farmer delivering the wagon to the blower may be engaged in other activities while the wagon is being unloaded.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A wagon gate having means for unloading loose farm produce from an associated wagon, said unloading means comprising a plurality of shafts rotatably mounted on an inner surface of said wagon gate, said shafts extending transversely of said wagon gate and having tines mounted thereon, drive means operatively connected to said shafts for rotating the same, said drive means including a prime mover mounted on an outer surface of said wagon gate, said wagon gate being provided with mounting hinges at an upper edge thereof, adjustable spacing members carried by said wagon gate retaining said wagon gate in an open position.

2. A wagon gate having means for unloading loose farm produce from an associated wagon, said unloading means comprising a plurality of shafts rotatably mounted on an inner surface of said wagon gate, said shafts extending transversely of said wagon gate and having tines mounted thereon, said shafts including central shafts and outer shafts, a prime mover secured to an outer face of said wagon gate, said prime mover being operatively connected to said central shafts, said central shafts being drivingly connected to said outer shafts, said wagon gate being provided with mounting hinges at an upper edge thereof and adjustable spacing members carried by said wagon gate for retaining it in adjusted open position relative to the wagon.

References Cited in the file of this patent

UNITED STATES PATENTS

| Number | Name | Date |
|---|---|---|
| 971,436 | Funk | Sept. 27, 1910 |
| 1,321,152 | Rude | Nov. 11, 1919 |
| 2,434,718 | Recker | Jan. 20, 1948 |
| 2,463,643 | Recker | Mar. 8, 1949 |
| 2,563,158 | Claffey | Aug. 7, 1951 |
| 2,573,270 | Miller | Oct. 30, 1951 |
| 2,600,008 | Ludeking | June 10, 1952 |
| 2,601,618 | Kringle | June 24, 1952 |
| 2,653,028 | Templeton | Sept. 22, 1953 |
| 2,692,062 | Calamore | Oct. 19, 1954 |